United States Patent
Yoshizawa (10) Patent No.: US 9,326,048 B2
(45) Date of Patent: Apr. 26, 2016

(54) RADIO COMMUNICATION APPARATUS, RADIO COMMUNICATION METHOD, AND PROGRAM

(71) Applicant: Sony Corporation, Tokyo (JP)

(72) Inventor: Atsushi Yoshizawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 230 days.

(21) Appl. No.: 13/933,361

(22) Filed: Jul. 2, 2013

(65) Prior Publication Data

US 2014/0016525 A1 Jan. 16, 2014

(30) Foreign Application Priority Data

Jul. 11, 2012 (JP) ................................ 2012-155475

(51) Int. Cl.
*H04Q 1/50* (2006.01)
*H04B 1/00* (2006.01)

(52) U.S. Cl.
CPC . *H04Q 1/50* (2013.01); *H04B 1/006* (2013.01)

(58) Field of Classification Search
CPC ........... H04B 1/006; H04Q 1/50; H04Q 1/02; H04J 4/00; H04J 13/00; H04L 5/14; H04L 5/26; H04L 12/931; H04L 12/933; G05B 2219/33229; H03F 2200/294
USPC ......... 370/275–279, 293–294, 360, 386–390, 370/468, 478; 455/302, 552.1
See application file for complete search history.

(56) References Cited

U.S. PATENT DOCUMENTS

| 8,369,250 | B1* | 2/2013 | Khlat | 370/280 |
| 8,638,819 | B2* | 1/2014 | Chen et al. | 370/478 |
| 2007/0021080 | A1* | 1/2007 | Kuriyama et al. | 455/132 |
| 2010/0265852 | A1* | 10/2010 | Tikka et al. | 370/278 |
| 2011/0299431 | A1* | 12/2011 | Mikhemar et al. | 370/277 |
| 2012/0140682 | A1* | 6/2012 | Reed et al. | 370/277 |

FOREIGN PATENT DOCUMENTS

JP 2004-186713 A 7/2004

* cited by examiner

*Primary Examiner* — Mohamed Kamara
(74) *Attorney, Agent, or Firm* — Hazuki International, LLC (57) ABSTRACT

There is provided a radio communication apparatus including a duplexer including a first terminal for inputting and outputting a signal in a first frequency band, a second terminal for inputting and outputting a signal in a second frequency band, and a third terminal connected to an antenna, a reception system circuit which processes a reception signal, a transmission system circuit which generates a transmission signal, and a switch which, in a first mode, connects one of the first terminal and the second terminal to the reception system circuit and connects the other one of the first terminal and the second terminal to the transmission system circuit and which, in a second mode, connects the one of the first terminal and the second terminal to the reception system circuit and the transmission system circuit alternately.

10 Claims, 9 Drawing Sheets

RADIO COMMUNICATION APPARATUS, RADIO COMMUNICATION METHOD, AND PROGRAM

BACKGROUND

The present disclosure relates to a radio communication apparatus, a radio communication method, and a program.

In related art, a dual mode terminal supporting two different communication systems typically has parallel arrangement of circuits for one of the communication systems and circuits for the other. These circuits are connected to a duplexer via a switch.

For example, JP 2004-186713A discloses an example of a configuration of a dual mode terminal supporting a W-CDMA (wideband code division multiple access) system and a PHS (personal handy-phone system).

SUMMARY

Similarly, it is conceived that a dual mode terminal supporting FDD (Frequency Division Duplex) and TDD (Time Division Duplex) has parallel arrangement of circuits for FDD and circuits for TDD and that these circuits are connected to a duplexer via a switch. Although FDD and TDD are largely different from each other in a radio frame configuration, the circuits for FDD and the circuits for TDD are much in common with each other. The parallel arrangement of the circuits as described above leads to an increase of the size of the circuits and thus to an increase of the costs of the circuits.

In light of the foregoing, it is desirable to provide a mechanism making it possible to reduce the size of circuits for performing radio communication supporting both FDD and TDD and thus to reduce the costs of the circuits.

According to an embodiment of the present disclosure, there is provided a radio communication apparatus including a duplexer including a first terminal for inputting and outputting a signal in a first frequency band, a second terminal for inputting and outputting a signal in a second frequency band, and a third terminal connected to an antenna, a reception system circuit which processes a reception signal, a transmission system circuit which generates a transmission signal, and a switch which, in a first mode, connects one of the first terminal and the second terminal to the reception system circuit and connects the other one of the first terminal and the second terminal to the transmission system circuit and which, in a second mode, connects the one of the first terminal and the second terminal to the reception system circuit and the transmission system circuit alternately.

Further, according to an embodiment of the present disclosure, there is provided a communication control method performed by a radio communication apparatus including a duplexer which has a first terminal for inputting and outputting a signal in a first frequency band, a second terminal for inputting and outputting a signal in a second frequency band, and a third terminal connected to an antenna, a reception system circuit which processes a reception signal, and a transmission system circuit which generates a transmission signal, the method including in a first mode, connecting one of the first terminal and the second terminal to the reception system circuit and connecting the other one of the first terminal and the second terminal to the transmission system circuit, and in a second mode, connecting the one of the first terminal and the second terminal to the reception system circuit and the transmission system circuit alternately.

Further, according to an embodiment of the present disclosure, there is provided a program for causing a computer to execute by a radio communication apparatus including a duplexer which has a first terminal for inputting and outputting a signal in a first frequency band, a second terminal for inputting and outputting a signal in a second frequency band, and a third terminal connected to an antenna, a reception system circuit which processes a reception signal, and a transmission system circuit which generates a transmission signal, controlling a switch such that, in a first mode, one of the first terminal and the second terminal is connected to the reception system circuit and the other one of the first terminal and the second terminal is connected to the transmission system circuit, and controlling the switch such that, in a second mode, the one of the first terminal and the second terminal is connected to the reception system circuit and the transmission system circuit alternately.

As described above, according to the embodiments of the present disclosure, it is possible to reduce the size of circuits for performing radio communication supporting both FDD and TDD and thus to reduce the costs of the circuits.

DETAILED DESCRIPTION OF THE EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the descriptions will be given in the following order.
1. Introduction
   1.1. FDD and TDD in LTE
   1.2. Assumed heterogeneous network 1.3. Assumed terminal device configuration
1.4. Technical challenge
2. First Embodiment
2.1. Terminal device configuration
2.2. Processing flow
3. Second embodiment
3.1. Terminal device configuration
3.2. Processing flow
4. Conclusion
<<1. Introduction>>

Firstly, descriptions are given of FDD and TDD in LTE, an assumed heterogeneous network, an assumed terminal device configuration, and a technical challenge.

<1.1. FDD and TDD in LTE>

Firstly, a description is given of FDD (Frequency Division Duplex) and TDD (Time Division Duplex) in LTE which are a premise of the description of the present embodiments.

For an LTE (Long Term Evolution) system expected to be spread worldwide in the future, the 3GPP specifies both schemes of an FDD scheme and a TDD scheme. In the TDD scheme, one frequency is used for both an uplink and a downlink employing time division. Since the TDD scheme employs the time division, the maximum communication speed in the TDD scheme is in principle lower than the maximum communication speed in the FDD scheme. The TDD scheme, however, has a great advantage in a viewpoint of implementation, such as lower costs of terminal devices and base stations.

In the first place, according to the TDD scheme, simplified radio control and enhanced effective utilization of radio resources can lead to reduction of operation costs of a radio communication system.

Specifically, for example, the TDD scheme uses the same frequency for an uplink and a downlink, and thus it is possible to execute radio control based on channel reciprocity between the uplink and the downlink. For this reason, a base station can easily estimate a radio channel of the downlink by using a radio channel of the uplink. Thus, it is possible to remarkably simplify the radio control performed between the base station and a terminal device.

In the TDD scheme, it is also possible to change a channel configuration of the uplink and the downlink, that is, a link combination for each sub-frame included in a radio frame. Thus, it is possible to flexibly adjust amounts of radio resources for the uplink and the downlink depending on an actual traffic state.

By simplifying the radio control and enhancing the effective utilization of the radio resources as described above, the operation costs of the radio communication system can be reduced in the TDD scheme.

Secondly, according to the TDD scheme, it is possible to reduce manufacturing costs of a terminal device.

Specifically, for example, it is not necessary to provide a terminal device supporting the TDD scheme with a duplexer which is expensive and has a large mounting area, unlike a duplexer of a terminal device used in the FDD scheme.

In addition, the terminal device supporting the TDD scheme does not perform communications in the uplink and the downlink simultaneously. This does not in principle have sensitivity deterioration caused by interference of a transmission signal with a receiving circuit, that is, a considerable difficulty designing high-frequency circuits. The difficulty is a great concern in designing circuits of an FDD terminal device. Accordingly, a high-frequency amplifier circuit of the terminal device supporting the TDD scheme can be implemented at a lower cost than a high-frequency amplifier circuit of the terminal device supporting the FDD scheme.

As described above, from viewpoints of the duplexer and the high-frequency amplifier circuit, the manufacturing costs of the terminal device can be reduced in the TDD scheme.

The specifications for frequency bands for the LTE schemes drawn up by the 3GPP at present assume employment of one of the FDD scheme and the TDD scheme. Accordingly, an operator of an LTE system employs one of the FDD scheme and the TDD scheme in accordance with the specifications. As the result, the FDD scheme is employed in many cases at present. However, for the aforementioned reason, an LTE system supporting the TDD scheme can be considerably spread in the future.

<1.2. Assumed Heterogeneous Network>

Next, a description is given of an assumed heterogeneous network.

At present, spread of smart phones causes a concern about an increase of data traffic in a cellular system. Accordingly, it becomes increasingly important for cellular operators to increase communication capacities of cellular systems. Since it is conceivable under such circumstances that frequency resources might be depleted in the future, there is a demand for more efficient utilization of the frequency resources in the cellular systems. For example, resolutions of World Radiocommunication Conference (WRC) which is a radio standardization conference in ITU-R and the like point out the necessity of study of a new radio communication technology such as so-called cognitive radio.

In an example of a technique of effectively utilizing frequency resources for increasing a communication capacity, an operator arranges small cells such as picocells and femtocells in macrocels. In other words, the operator employs a heterogeneous network (hereinafter referred to as a "HetNet"). This enables the operator to obtain a larger communication capacity due to a cell division gain.

As described above, one of the FDD scheme and the TDD scheme is employed in the LTE system at present, but it is conceivable that in the aforementioned HetNet, both the FDD scheme and the TDD scheme are employed for the same frequency band, for example, under a certain technical requirement. For example, the operator can employ the FDD scheme for the macro cells and the TDD scheme for the small cells (for example, the femtocells).

According to HetNet as described above, the operator can increase a system capacity at a lower cost. It is desirable in the long view that user convenience be enhanced through such enhancement of the frequency utilization efficiency and cost reduction.

<1.3. Assumed Terminal Device Configuration>

Figure 1:
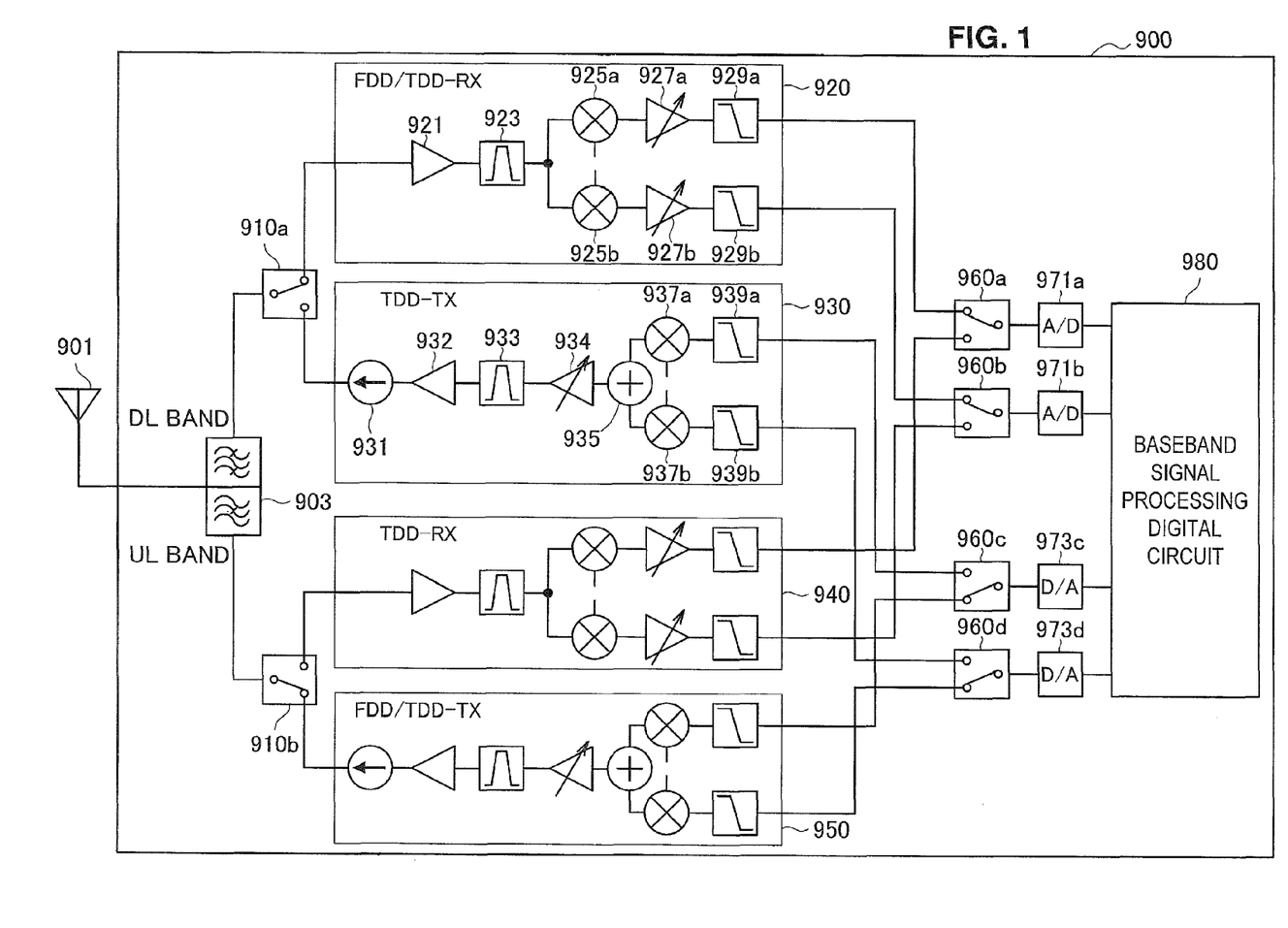
FIG. 1 is a block diagram illustrating an example of an assumed configuration of a dual mode terminal for FDD and TDD.

Next, with reference to FIG. 1, a description is given of an assumed configuration of a terminal device which performs radio communication supporting both FDD and TDD.

In the related art, a dual mode terminal supporting two different communication systems typically has parallel arrangement of circuits for one of the communication systems and circuits for the other. These circuits are connected to a duplexer via a switch.

For example, JP 2004-186713A discloses an example of a configuration of a dual mode terminal supporting a W-DCMA and PHS.

Similarly, it is conceived that a dual mode terminal supporting FDD and TDD has parallel arrangement of circuits for FDD and circuits for TDD and that the circuits are connected to a duplexer via a switch. Hereinbelow, this point will be described more specifically with reference to FIG. 1.

FIG. 1 is a block diagram illustrating an example of an assumed configuration of a dual mode terminal 900 for FDD and TDD. The dual mode terminal 900 enables TDD radio communication in both an uplink frequency band and a downlink frequency band which are provided for FDD. With reference to FIG. 1, the dual mode terminal 900 includes a reception system circuit 920 (FDD/TDD-RX) and a transmission system circuit 930 (TDD-TX) which are provided for the downlink frequency band. The dual mode terminal 900 also includes a reception system circuit 940 (TDD-RX) and a transmission system circuit 950 (FDD-/TDD-TX) which are provided for the uplink frequency band. The dual mode terminal 900 further includes an antenna 901, a duplexer 903, a high-frequency switch 910, a switch 960, an analog/digital (A/D) converter 971, a digital/analog (D/A) converter 973, and a baseband signal processing digital circuit 980.

In the dual mode terminal 900, the baseband signal processing digital circuit 980 is a circuit common to FDD and TDD. As for a high-frequency part, there are provided: the reception system circuit 920 and the transmission system circuit 950 which are provided for FDD; and the transmission system circuit 930 for the downlink frequency band and the reception system circuit 940 for the uplink frequency band which are provided for TDD. These circuits are switched over by the high-frequency switch 910 and thereby the corresponding circuits are connected to the duplexer 903. These circuits are also switched over by the switch 960 and thereby the corresponding circuits are connected to the A/D converter 971 or the D/A converter 973.

The reception system circuit 920 for the downlink frequency band includes, for example, a low-noise amplifier 921, a bandpass filter 923, a mixer 925, an AGC (Automatic Gain Controls) 927, and a lowpass filter 929. The mixer 925, the AGC 927, and the lowpass filter 929 form a quadrature demodulator. Such a reception system circuit configuration is an example of a configuration of a general reception system circuit. The reception system circuit 940 for the uplink frequency band also includes these components, for example, like the reception system circuit 920.

The transmission system circuit 930 for the downlink frequency band includes an isolator 931, an amplifier 932, a bandpass filter 933, an AGC 934, an adder 935, a mixer 937, and a lowpass filter 939. The adder 935, the mixer 937, and the lowpass filter 939 form a quadrature modulator. Such a transmission system circuit configuration is an example of a configuration of a general transmission system circuit. The transmission system circuit 950 for the uplink frequency band also includes these components, for example, like the transmission system circuit 930.

The dual mode terminal 900 as described above uses the antenna and the duplexer which are common to FDD and TDD, without using antennas and duplexers provided separately for FDD and TDD. Thus, it is possible to reduce the costs of the dual mode terminal 900.

Several options are conceivable for a technique of implementing the high-frequency switch 910 for connection to the duplexer 903. However, when a several GHz frequency band is used, a relatively expensive switch is desirable in some cases, such as a compound semiconductor switch or a MEMS switch. As described above, the high-frequency switch 910 has a large impact on the performance and the costs of the dual mode terminal 900, and thus it is necessary to pay full attention to the technique of implementing the high-frequency switch 910.

Meanwhile, a signal passing through the switch 960 connected to the A/D converter 971 or the D/A converter 973 is a baseband signal, and thus a performance requirement of the switch 960 is not as high as that of the high-frequency switch 910. That is, the switch 960 does not have a large impact from viewpoints of the performance and costs. The switch 960 can be implemented, for example, by being included in a CMOS (Complementary Metal-Oxide Semiconductor) chip.

<1.4. Technical Challenge>

Next, a description is given of a technical challenge to be addressed in the present embodiments.

As described above with reference to FIG. 1, according to the technique using the circuit configuration in the related art, the dual mode terminal supporting FDD and TDD has parallel arrangement of the circuits for FDD and the circuits for TDD in the high-frequency part. Although FDD and TDD are largely different from each other in a radio frame configuration, the circuits for FDD and TDD are much in common with each other.

More specifically, for example, the reception system circuit 920 for the downlink frequency band for FDD and TDD and the reception system circuit 940 for the uplink frequency band for TDD have the same configuration. In other words, the reception system circuit 920 and the reception system circuit 940 each include the low-noise amplifier 921, the bandpass filter 923, the mixer 925, the AGC 927, and the lowpass filter 929.

In addition, for example, the transmission system circuit 950 for the uplink frequency band for FDD and TDD and the transmission system circuit 930 for the downlink frequency band for TDD have the same configuration. In other words, the transmission system circuit 950 and the transmission system circuit 930 each include the isolator 931, the amplifier 932, the bandpass filter 933, the AGC 934, the adder 935, the mixer 937, and the lowpass filter 939.

As described above, in the technique in the related art using the parallel arrangement of the circuits, the circuits are much in common with each other. In other words, the circuits have a redundant configuration. Accordingly, the size of the circuits becomes large, and thus the costs thereof become high.

Hence, in the embodiments according to the present disclosure, it is possible to reduce the size of circuits for radio communication supporting both FDD and TDD and thus to reduce the costs of the circuits. Hereinafter, the embodiments will be described specifically in <<2. First embodiment>> and <<3. Second embodiment>>.

<<2. First Embodiment>>

Firstly, a description is given of a first embodiment of the present disclosure. According to the first embodiment of the present disclosure, circuits for FDD and circuits for TDD are shared. In addition, a switchover is performed by a high-frequency switch, so that the FDD mode and the TDD mode are implemented.

<2.1. Terminal Device Configuration>

Figure 2:
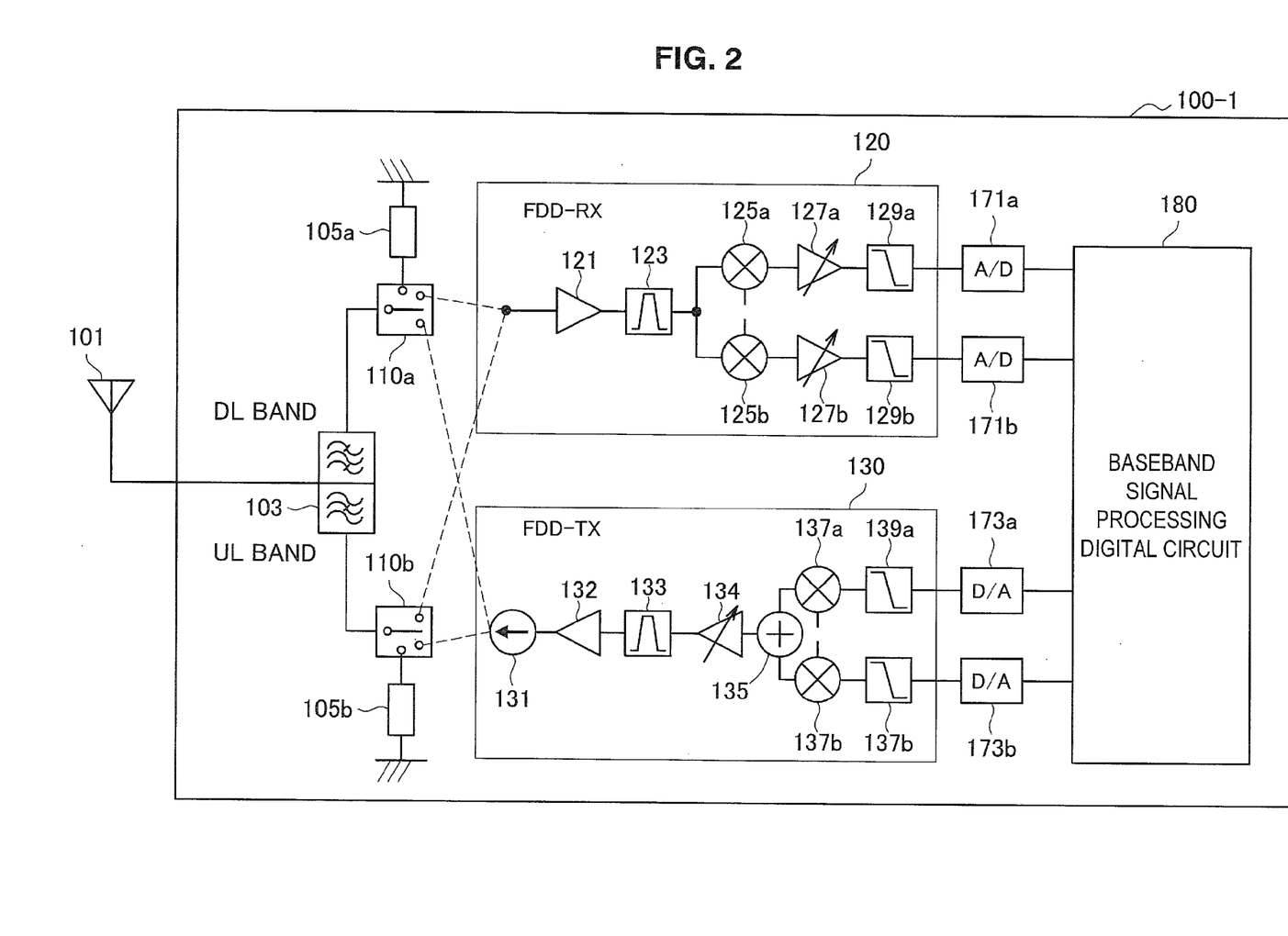
FIG. 2 is a block diagram illustrating an example of a configuration of a terminal device according to a first embodiment.

An example of a configuration of a terminal device 100-1 according to the first embodiment will be described with reference to FIGS. 2 to 5. FIG. 2 is a block diagram illustrating an example of the configuration of the terminal device 100-1 according to the first embodiment. With reference to FIG. 2, the terminal device 100-1 includes an antenna 101, a duplexer 103, a load circuit 105, a high-frequency switch 110, a reception system circuit 120, a transmission system circuit 130, an A/D converter 171, a D/A converter 173, and a baseband signal processing digital circuit 180.

(Antenna 101)

The antenna 101 receives a radio signal and converts the radio signal into an electric reception signal. Then, the antenna 101 supplies the duplexer 103 with the reception signal. The antenna 101 also receives a transmission signal from the duplexer 103. Then, the antenna 101 transmits the transmission signal as a radio signal.

(Duplexer 103)

The duplexer 103 includes a first terminal for inputting and outputting signals in a first frequency band, a second terminal for inputting and outputting signals in a second frequency band, and a third terminal connected to the antenna 101. More specifically, for example, one of the first frequency band and the second frequency band is a frequency band used in FDD for a downlink (hereinafter, referred to as a "downlink frequency band"). In addition, for example, the other one of the first frequency band and the second frequency band is a frequency band used in FDD for an uplink (hereinafter, referred to as an "uplink frequency band"). To put it differently, the duplexer 103 includes a DL band terminal for inputting and outputting signals in the downlink frequency band, an UL band terminal for inputting and outputting signals in the uplink frequency band, and an antenna terminal connected to the antenna 101.

In addition, the duplexer 103 outputs a reception signal in the downlink frequency band, among reception signals from the antenna 101, to a high-frequency switch 110a through the DL band terminal. The duplexer 103 also outputs a reception signal in the uplink frequency band, among the reception signals from the antenna 101, to a high-frequency switch 110b through the UL band terminal.

In addition, the duplexer 103 outputs, to the antenna 101, a transmission signal in the downlink frequency band inputted from the high-frequency switch 110a through the DL band terminal. The duplexer 103 also outputs, to the antenna 101, a transmission signal in the uplink frequency band inputted from the high-frequency switch 110b through the UL band terminal.

Note that the duplexer 103 is designed appropriately in consideration of inputting of not only the reception signal but also the transmission signal on the downlink frequency band side. For example, a filter characteristic such as an attenuation characteristic of a transmission high frequency wave, an input allowable level satisfactory for inputting a transmission power, and the like can be considered in designing the duplexer 103. The duplexer 103 is also designed appropriately in consideration of inputting of not only the transmission signal but also the reception signal on the uplink frequency band side. For example, a filter characteristic of an attenuation characteristic of a disturbing wave in a vicinity area and the like can be considered.

(Load Circuit 105)

The load circuit 105 is a circuit involving first impedance. For example, the first impedance corresponds to input impedance of a low-noise amplifier 121 of the reception system circuit 120 or output impedance of an isolator 131 of the transmission system circuit 130. To simplify designing and manufacturing, the first impedance of the load circuit 105 is pure resistance of, for example, 50Ω. More strictly, the first impedance of a load circuit 105a may be equivalent to output impedance of the isolator 131, and the first impedance of a load circuit 105b may be equivalent to input impedance of the low-noise amplifier 121.

In addition, the load circuit 105 includes at least one of, for example, a resistor, a capacitor, and an inductor.

(High-frequency Switch 110)

The high-frequency switch 110 connects: the duplexer 103 and the reception system circuit 120; and the duplexer 103 and the transmission system circuit 130.

More specifically, the high-frequency switch 110 connects one of the first terminal and the second terminal to the reception system circuit 120 in a first mode, and connects the other one of the first terminal and the second terminal to the transmission system circuit 130. Further specifically, for example, the first mode is the FDD mode. In the FDD mode, the high-frequency switch 110 connects the DL band terminal to the reception system circuit 120, and connects the UL band terminal to the transmission system circuit 130. Hereinbelow, this point will be described more specifically with reference to FIG. 3.

Figure 3:
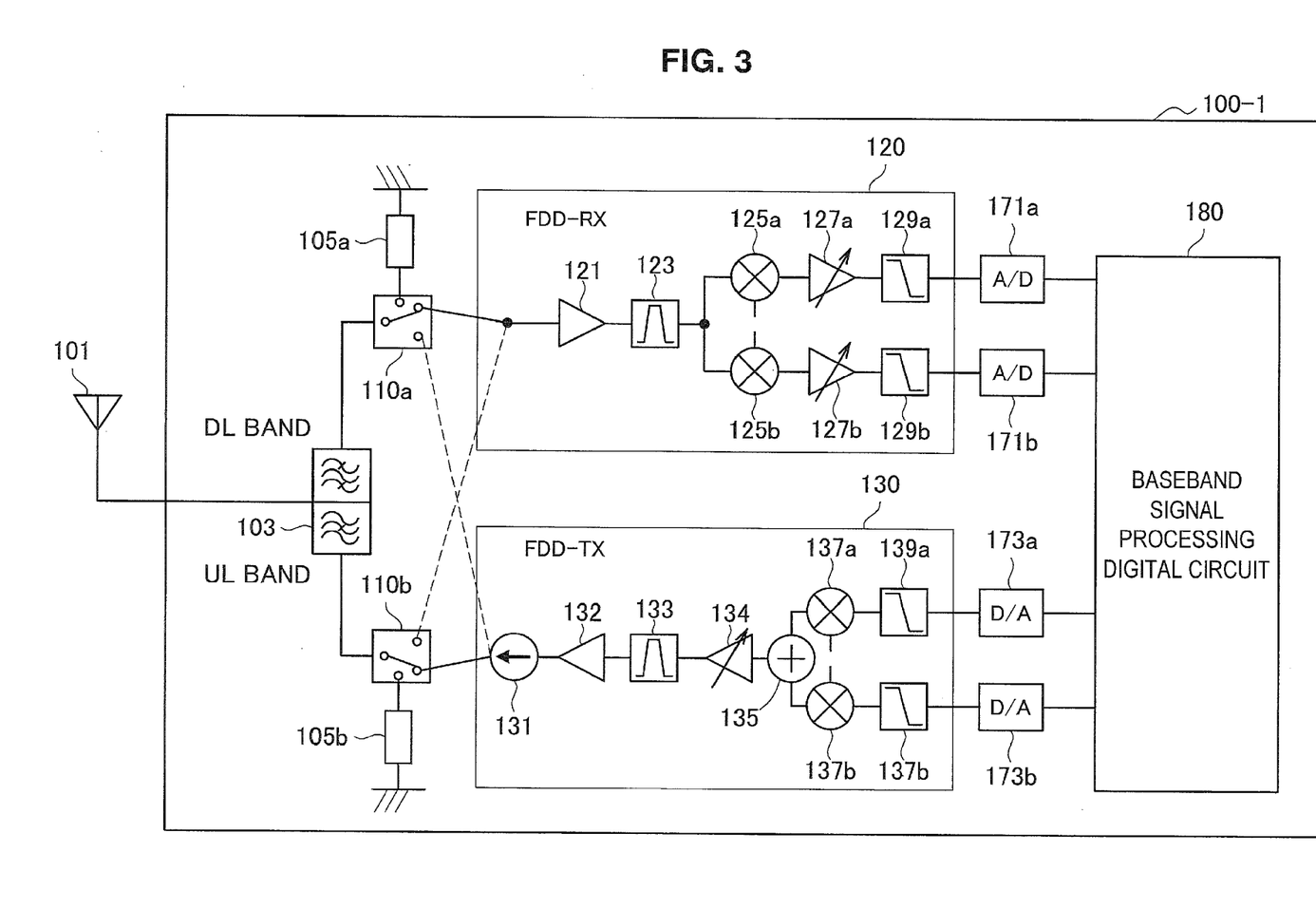
FIG. 3 is an explanatory diagram illustrating an operation of a high-frequency switch according to the first embodiment for performing radio communication in an FDD mode.

FIG. 3 is an explanatory diagram illustrating an operation of the high-frequency switch 110 according to the first embodiment for performing radio communication in the FDD mode. With reference to FIG. 3, in the FDD mode, the high-frequency switch 110a connects the DL band terminal of the duplexer 103 to the reception system circuit 120, while the high-frequency switch 110b connects the UL band terminal of the duplexer 103 to the transmission system circuit 130. Such connection enables the terminal device 100-1 to process a reception signal of the downlink frequency band in the reception system circuit 120 and to generate a transmission signal of the uplink frequency band in the transmission system circuit 130. In other words, the terminal device 100-1 can perform the radio communication in the FDD mode.

In a second mode, the high-frequency switch 110 connects one of the first terminal and the second terminal to the reception system circuit 120 and the transmission system circuit 130 alternately. Further specifically, for example, the second mode is the TDD mode. In the TDD mode, the high-frequency switch 110 connects one of the DL band terminal and the UL band terminal to the reception system circuit 120 and the transmission system circuit 130 alternately. Hereinbelow, this point will be described more specifically with reference to FIGS. 4 and 5.

Figure 4:
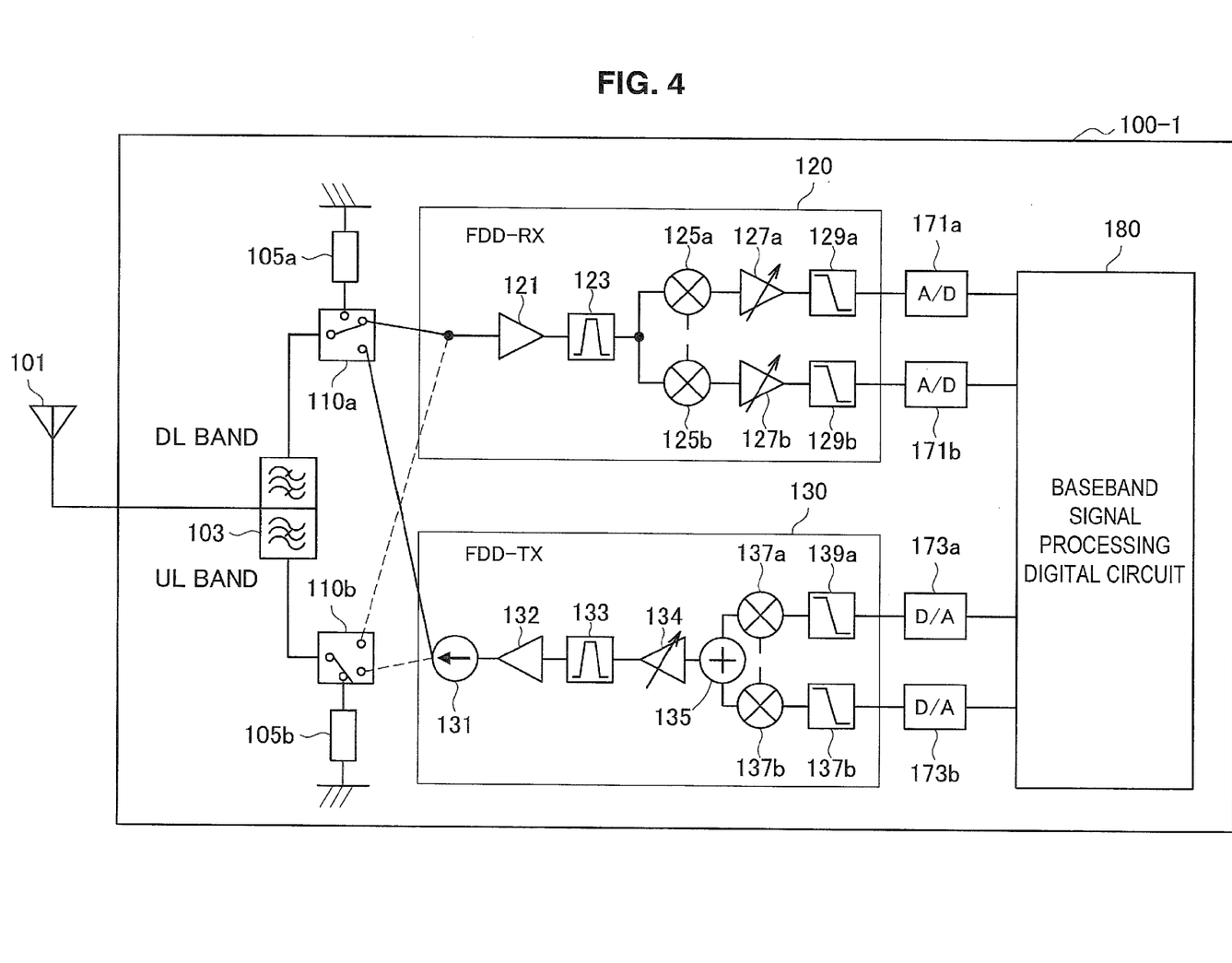
FIG. 4 is an explanatory diagram illustrating an operation of the high-frequency switch according to the first embodiment for performing the radio communication in a TDD mode in a downlink frequency band.

FIG. 4 is an explanatory diagram illustrating an operation of the high-frequency switch 110 according to the first embodiment for performing the radio communication in the downlink frequency band in the TDD mode. With reference to FIG. 4, in the TDD mode in the downlink frequency band, the high-frequency switch 110a connects the DL band terminal of the duplexer 103 to the reception system circuit 120 and the transmission system circuit 130 alternately. In other words, the high-frequency switch 110a connects the DL band terminal to the reception system circuit 120 in a period in which a radio signal is received in the downlink frequency band, and connects the DL band terminal to the transmission system circuit 130 in a period in which a radio signal is transmitted in the downlink frequency band. Such connection enables the terminal device 100-1 to process a reception signal of the downlink frequency band in the reception system circuit 120 and to generate a transmission signal of the downlink frequency band in the transmission system circuit 130. In other words, the terminal device 100-1 can perform the radio communication in the downlink frequency band in the TDD mode.

Figure 5:
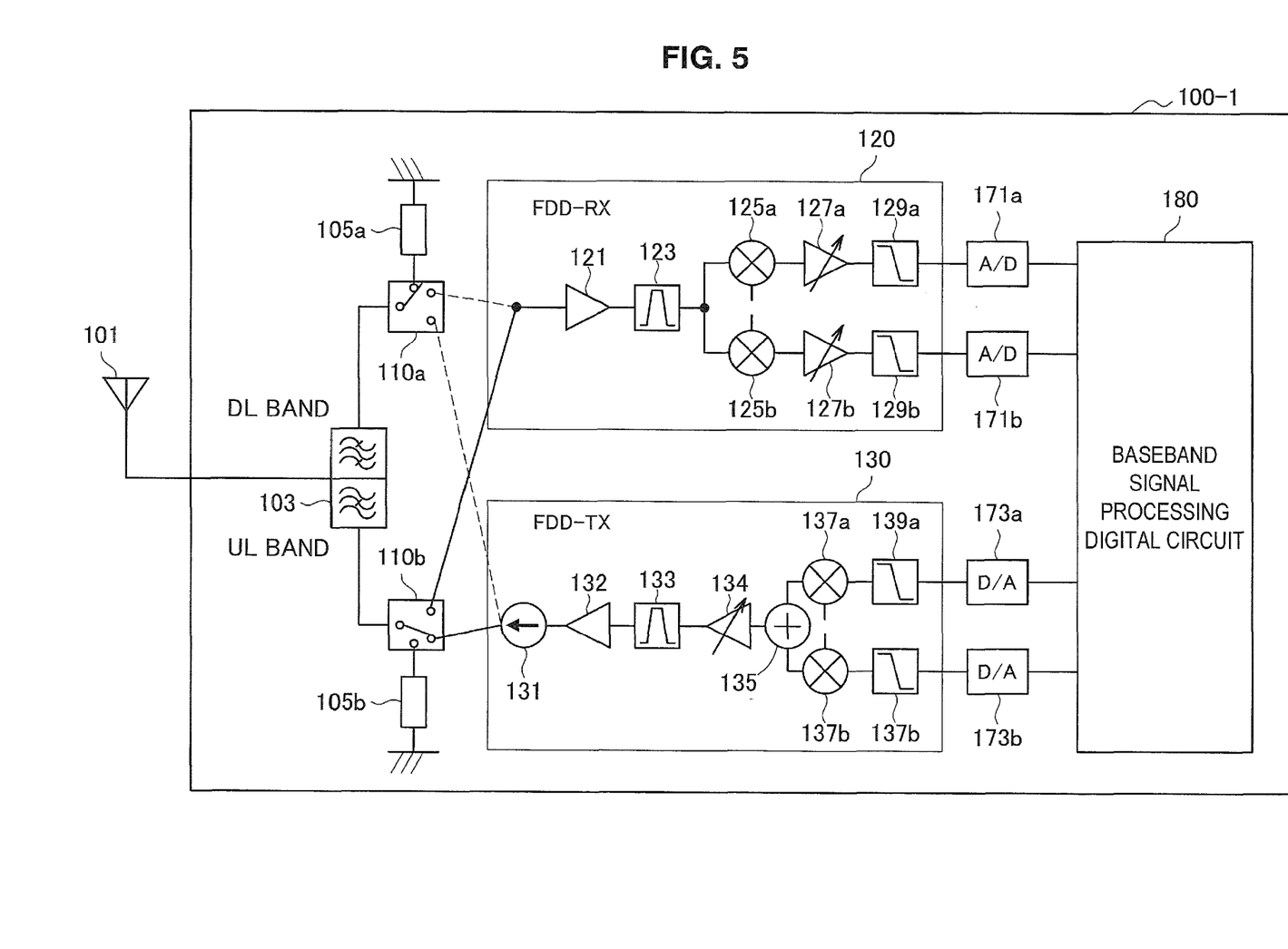
FIG. 5 is an explanatory diagram illustrating an operation of the high-frequency switch according to the first embodiment for performing the radio communication in the TDD mode in an uplink frequency band.

FIG. 5 is an explanatory diagram illustrating an operation of the high-frequency switch 110 according to the first embodiment for performing the radio communication in the uplink frequency band in the TDD mode. With reference to FIG. 5, in the TDD mode in the uplink frequency band, the high-frequency switch 110b connects the UL band terminal of the duplexer 103 to the reception system circuit 120 and the transmission system circuit 130 alternately. In other words, the high-frequency switch 110a connects the UL band terminal to the reception system circuit 120 in a period in which a radio signal is received in the uplink frequency band, and connects the UL band terminal to the transmission system circuit 130 in a period in which a radio signal is transmitted in the uplink frequency band. Such connection enables the terminal device 100-1 to process a reception signal of the uplink frequency band in the reception system circuit 120 and to generate a transmission signal of the uplink frequency band in the transmission system circuit 130. In other words, the terminal device 100-1 can perform the radio communication in the uplink frequency band in the TDD mode.

In the second mode, for example, the high-frequency switch 110 also connects the other one of the first terminal and the second terminal to the load circuit 105. More specifically, in the TDD mode, for example, the high-frequency switch 110 connects, to the load circuit 105, the other one of the DL band terminal and the UL band terminal which is not connected to the reception system circuit 120 and the transmission system circuit 130. As described above, in the TDD mode, the load circuit 105 is used as an end terminal for the high-frequency switch 110 which does not connect the reception system circuit 120 and the transmission system circuit 130 with the duplexer 103. Thereby, it is possible to reduce an insertion loss in the duplexer 103. In other words, without such an end terminal, the duplexer 103 might have such trouble that a passband becomes narrow or a frequency band which should be cut off is not cut off. However, with the end terminal which is the load circuit 105, such trouble can be prevented.

Note that the high-frequency switch 110 can be implemented in any appropriate form. For example, the high-frequency switch 110 may be a compound semiconductor switch or a MEMS (Micro Electro Mechanical Systems) switch. The high-frequency switch 110 is preferably a switch which can minimize losses of both the reception and transmission signals.

(Reception System Circuit 120)

The reception system circuit 120 processes a reception signal. More specifically, the reception system circuit 120 amplifies and demodulates a high-frequency reception signal to output an analog baseband signal. Like the aforementioned configuration of the reception system circuits 920 and 940, the reception system circuit 120 includes, for example, the low-noise amplifier 121, a bandpass filter 123, a mixer 125, an AGC 127, and a lowpass filter 129. The mixer 125, the AGC 127, and the lowpass filter 129 form a quadrature demodulator.

Here, the bandpass filter 123 performs a passband switchover, for example, between the downlink frequency band and the uplink frequency band in processing a reception signal. More specifically, for example, the bandpass filter 123 includes a first bandpass filter involving a first passband for the reception signal in the downlink frequency band and a second bandpass filter involving a second passband for the reception signal in the uplink frequency band. Connection of the reception system circuit 120 to the high-frequency switch 110*a* uses the first bandpass filter, while connection of the reception system circuit 120 to the high-frequency switch 110*b* uses the second bandpass filter.

The lowpass filter 129 also performs a cut-off frequency switchover, for example, between the downlink frequency band and the uplink frequency band in processing a reception signal. More specifically, for example, the lowpass filter 129 includes a first lowpass filter involving a first cut-off frequency for the reception signal in the downlink frequency band and a second lowpass filter involving a second cut-off frequency for the reception signal in the uplink frequency band. Connection of the reception system circuit 120 to the high-frequency switch 110*a* uses the first lowpass filter, while connection of the reception system circuit 120 to the high-frequency switch 110*b* uses the second lowpass filter.

The bandpass filter 123 and the lowpass filter 129 as described above can be implemented to be switchable in a semiconductor integrated circuit, for example. Alternatively, the bandpass filter 123 and the lowpass filter 129 may be used by being externally connected to a semiconductor integrated circuit to be switchable.

In addition, the mixer 125 can input local frequencies appropriate for, for example, a reception signal in the downlink frequency band and a reception signal in the uplink frequency band, respectively. More specifically, for example, the mixer 125 includes a local oscillator which can support a wide bandwidth including both the downlink frequency band and the uplink frequency band. Alternatively, the mixer 125 may include a first local oscillator for the downlink frequency band and a second local oscillator for the uplink frequency band. Connection of the reception system circuit 120 to the high-frequency switch 110*a* may use the first local oscillator, while connection of the reception system circuit 120 to the high-frequency switch 110*b* may use the second local oscillator.

For example, as described above, the bandpass filter 123, the lowpass filter 129, and the mixer 125 can process reception signals in the downlink frequency band and in the uplink frequency band. Note that the bandpass filter 123, the lowpass filter 129, and the mixer 125 might lead to an increase of the size of circuits and thus to an increase of the costs thereof in comparison with the bandpass filter 923, the lowpass filter 929, and the mixer 925 in the related art. However, in the present embodiment in comparison with the case of the parallel arrangement of the reception system circuits as illustrated in FIG. 1, it is possible to reduce the size of the reception system circuits as a whole and thus to reduce the costs thereof as a whole.

(Transmission System Circuit 130)

The transmission system circuit 130 generates a transmission signal. More specifically, the transmission system circuit 130 modulates and amplifies an analogue baseband signal to output a high-frequency transmission signal. Like the aforementioned configuration of the transmission system circuits 930 and 950, the transmission system circuit 130 includes, for example, the isolator 131, an amplifier 132, a bandpass filter 133, an AGC 134, an adder 135, a mixer 137, and a lowpass filter 139. The adder 135, the mixer 137, and the lowpass filter 139 form a quadrature modulator.

Like the bandpass filter 123 of the reception system circuit 120, the bandpass filter 133 performs a passband switchover, for example, between the downlink frequency band and the uplink frequency band in processing a transmission signal.

Like the lowpass filter 129 of the reception system circuit 120, the lowpass filter 139 also performs a cut-off frequency switchover, for example, between the downlink frequency band and the uplink frequency band in processing a transmission signal.

Like the mixer 125 of the reception system circuit 120, the mixer 137 can also input local frequencies appropriate for, for example, a transmission signal in the downlink frequency band and a transmission signal in the uplink frequency band, respectively.

Note that also in the transmission system circuits, in the present embodiment in comparison with the case of the parallel arrangement of the transmission system circuits as illustrated in FIG. 1, the size of the transmission system circuits can be reduced as a whole and the costs thereof can be reduced as a whole.

(A/D Converter 171)

The A/D converter 171 performs A/D conversion on the analogue baseband signal outputted by the reception system circuit 120. For example, an A/D converter 171*a* performs the A/D conversion on an In-phase component of the analogue baseband signal, and an A/D converter 171*b* performs the A/D conversion on a Quadrature component of the analogue baseband signal. The A/D converter 171 outputs a digital baseband signal by the A/D conversion.

(D/A Converter 173)

The D/A converter 173 performs D/A conversion on a digital baseband signal outputted by the baseband signal processing digital circuit 180. For example, a D/A converter 173a performs the D/A conversion on an In-phase component of the digital baseband signal, and a D/A converter 173b performs the D/A conversion on a Quadrature component of the digital baseband signal. The D/A converter 173 outputs an analogue baseband signal by the D/A conversion.

(Baseband Signal Processing Digital Circuit 180)

The baseband signal processing digital circuit 180 processes a received digital baseband signal and generates a digital baseband signal to be transmitted.

<2.2. Processing Flow>

Figure 6:
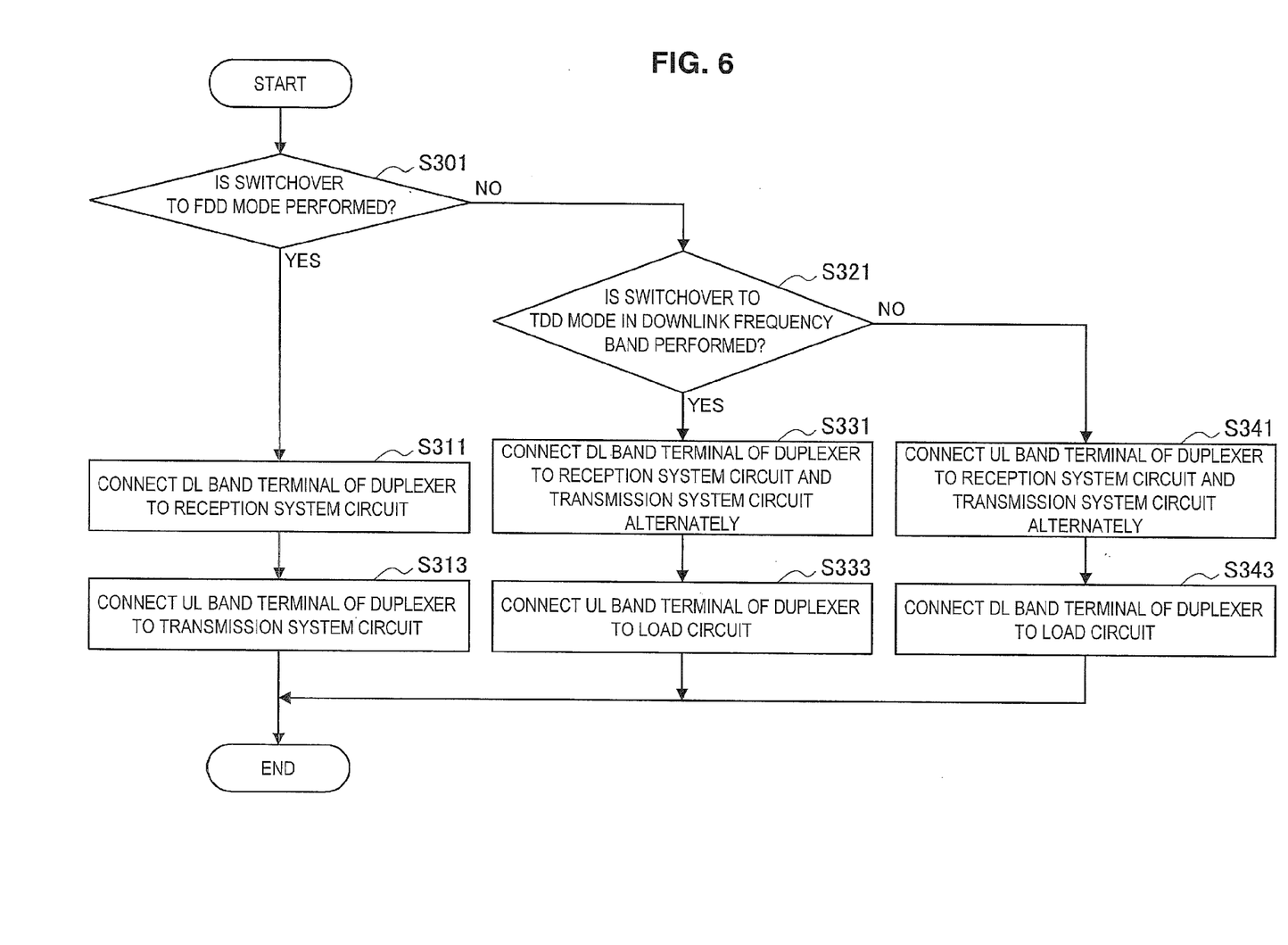
FIG. 6 is a flowchart illustrating an example of a schematic flow of communication control processing according to the first embodiment.

Next, an example of communication control processing according to the first embodiment will be described with reference to FIG. 6. FIG. 6 is a flowchart illustrating an example of a schematic flow of the communication control processing according to the first embodiment. The communication control processing is started by a switchover of communication mode (duplex system).

Firstly, in Step S301, it is determined whether a switchover to the FDD mode is performed. If the switchover is performed, the processing proceeds to Step S311. If the switchover is not performed, the processing proceeds to Step S321.

In Step S311, the high-frequency switch 110a connects the DL band terminal of the duplexer 103 to the reception system circuit 120. In Step S313, the high-frequency switch 110b connects the UL band terminal of the duplexer 103 to the transmission system circuit 130. Then, the processing is terminated.

In Step S321, it is determined whether a switchover to the TDD mode in the downlink frequency band is performed. If the switchover is performed, the processing proceeds to Step S331. If the switchover is not performed, the processing proceeds to Step S341.

In Step S331, the high-frequency switch 110a is set to connect the DL band terminal of the duplexer 103 to the reception system circuit 120 and the transmission system circuit 130 alternately. In Step S333, the high-frequency switch 110b connects the UL band terminal of the duplexer 103 to the load circuit 105b. Then, the processing is terminated.

In Step S341, the high-frequency switch 110b is set to connect the UL band terminal of the duplexer 103 to the reception system circuit 120 and the transmission system circuit 130 alternately. In Step S343, the high-frequency switch 110a connects the DL band terminal of the duplexer 103 to the load circuit 105a. Then, the processing is terminated.

The first embodiment has heretofore been described. According to the first embodiment, the circuits for FDD and the circuits for TDD are shared, and each of the FDD mode and the TDD mode is implemented due to the switchover by the high-frequency switch 110. Accordingly, it is possible to reduce the size of the circuits for performing the radio communication supporting both FDD and TDD, and thus to reduce the costs of the circuits. In addition, the circuit size reduction leads to power consumption reduction.

<<3. Second Embodiment>>

Next, a description is given of a second embodiment of the present disclosure. According to the first embodiment, the circuit size can be reduced. However, isolation between the reception system circuit 120 and the transmission system circuit 130 is deteriorated due to the high-frequency switch 110, and thus a transmission signal from the transmission system circuit 130 might be leaked to the reception system circuit 120 through the high-frequency switch 110. Then, in the FDD mode in which the reception system circuit 120 and the transmission system circuit 130 operate simultaneously, when a reception circuit has a small dynamic range, the transmission signal thus leaked (that is, leakage signal) might cause saturation of the reception circuit. As the result, the reception sensitivity of the terminal device 100-1 might be deteriorated. Hence, in the second embodiment, a leakage signal leaked from the transmission system circuit 130 to the reception system circuit 120 through the high-frequency switch 110 is cancelled out.

<3.1. Terminal Device Configuration>

Figure 7:
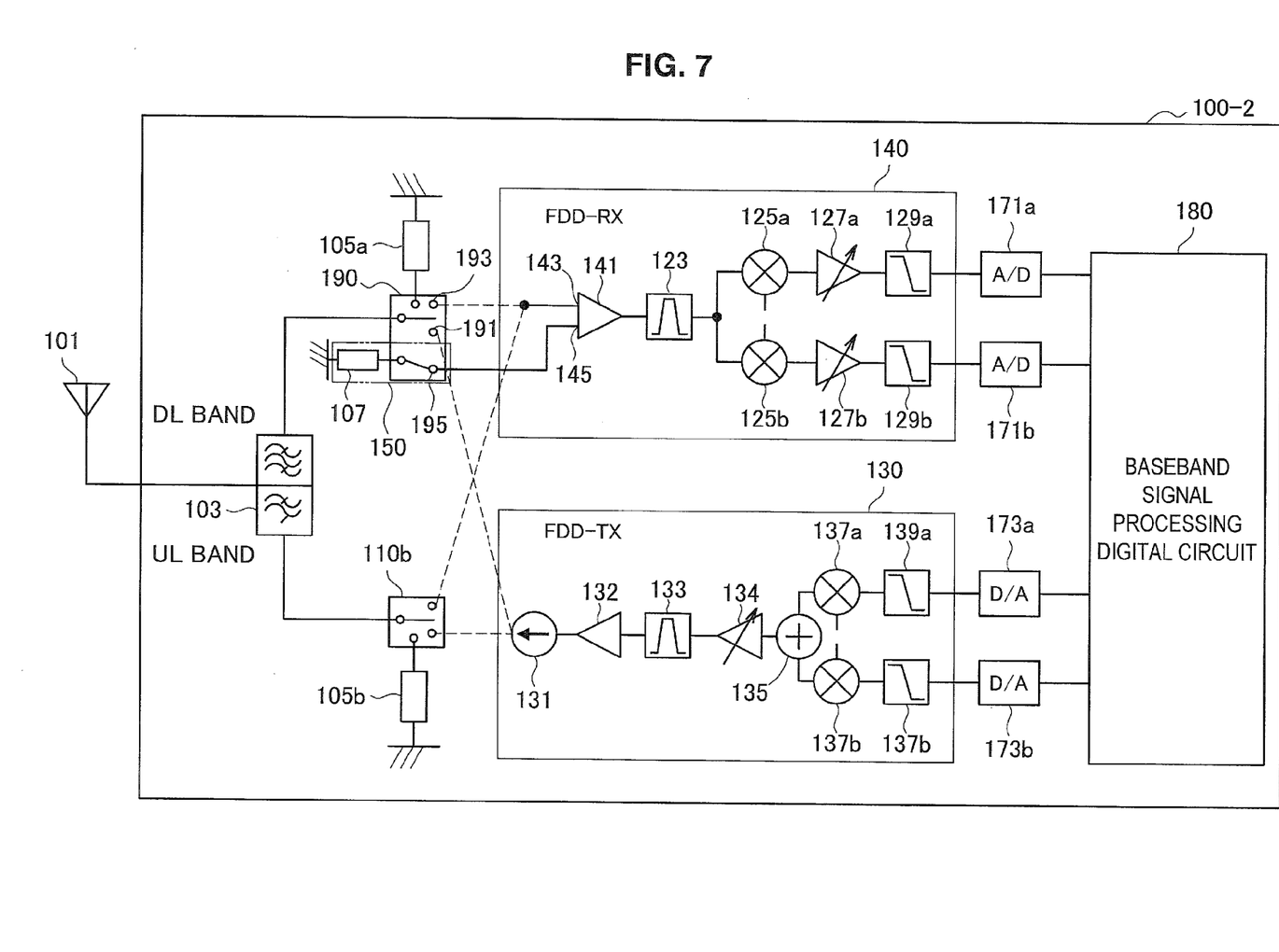
FIG. 7 is a block diagram illustrating an example of a configuration of a terminal device according to a second embodiment.

An example of a configuration of a terminal device 100-2 according to the second embodiment will be described with reference to FIGS. 7 to 9. FIG. 7 is a block diagram illustrating an example of a configuration of the terminal device 100-2 according to the second embodiment. With reference to FIG. 7, the terminal device 100-2 includes the antenna 101, the duplexer 103, the load circuit 105, a load circuit 107, the high-frequency switch 110b, a reception system circuit 140, the transmission system circuit 130, the A/D converter 171, the D/A converter 173, the baseband signal processing digital circuit 180, and a high-frequency switch 190. The terminal device 100-2 further includes a replica circuit 150. The replica circuit 150 includes the load circuit 107 and part of the high-frequency switch 190.

Here, the antenna 101, the duplexer 103, the load circuit 105, the high-frequency switch 110b, the transmission system circuit 130, the A/D converter 171, the D/A converter 173, and the baseband signal processing digital circuit 180 do not have a difference between the first embodiment and the second embodiment. Accordingly, descriptions are herein given of the load circuit 107, the reception system circuit 140, the high-frequency switch 190, and the replica circuit 150.

(Load Circuit 107)

The load circuit 107 is a circuit involving second impedance. For example, the second impedance corresponds to the output impedance of the duplexer 103. The output impedance is output impedance on the downlink frequency band side of the duplexer 103. The second impedance of the load circuit 107 is set to be equivalent to, for example, the output impedance on the downlink frequency band side of the duplexer 103 so as to cancel out the leakage signal with high accuracy. Note that when priority is given to simplification of designing and manufacturing, the second impedance of the load circuit 107 may be pure resistance of, for example, 50Ω.

The load circuit 107 includes at least one of, for example, a resistor, a capacitor, and an inductor.

The load circuit 107 is included in the replica circuit 150.

(Reception System Circuit 140)

The reception system circuit 140 processes a reception signal. More specifically, the reception system circuit 140 amplifies and demodulates a high-frequency reception signal to output an analog baseband signal. In the second embodiment, the reception system circuit 140 includes a differential amplifier 141 having a first differential terminal 143 and a second differential terminal 145, instead of the low-noise amplifier 121. For example, the differential amplifier 141 amplifies a signal obtained by subtracting input information to the second differential terminal 145, from an input signal to the first differential terminal 143.

The second differential terminal 145 of the differential amplifier 141 is connected to the replica circuit 150.

Note that like the reception system circuit 120 according to the first embodiment, the reception system circuit 140 includes the bandpass filter 123, the mixer 125, the AGC 127, and the lowpass filter 129.

(High-frequency Switch 190)

The high-frequency switch 190 connects: the duplexer 103 and the reception system circuit 140; and the duplexer 103 and the transmission system circuit 130.

More specifically, the high-frequency switch 190 connects one of the first terminal and the second terminal of the duplexer 103 to the first differential terminal 143 of the differential amplifier 141 in a first mode. Further specifically, for example, the first mode is the FDD mode. In the FDD mode, the high-frequency switch 190 connects a DL band terminal to the first differential terminal 143 of the differential amplifier 141. Hereinbelow, this point will be described more specifically with reference to FIG. 8.

Figure 8:
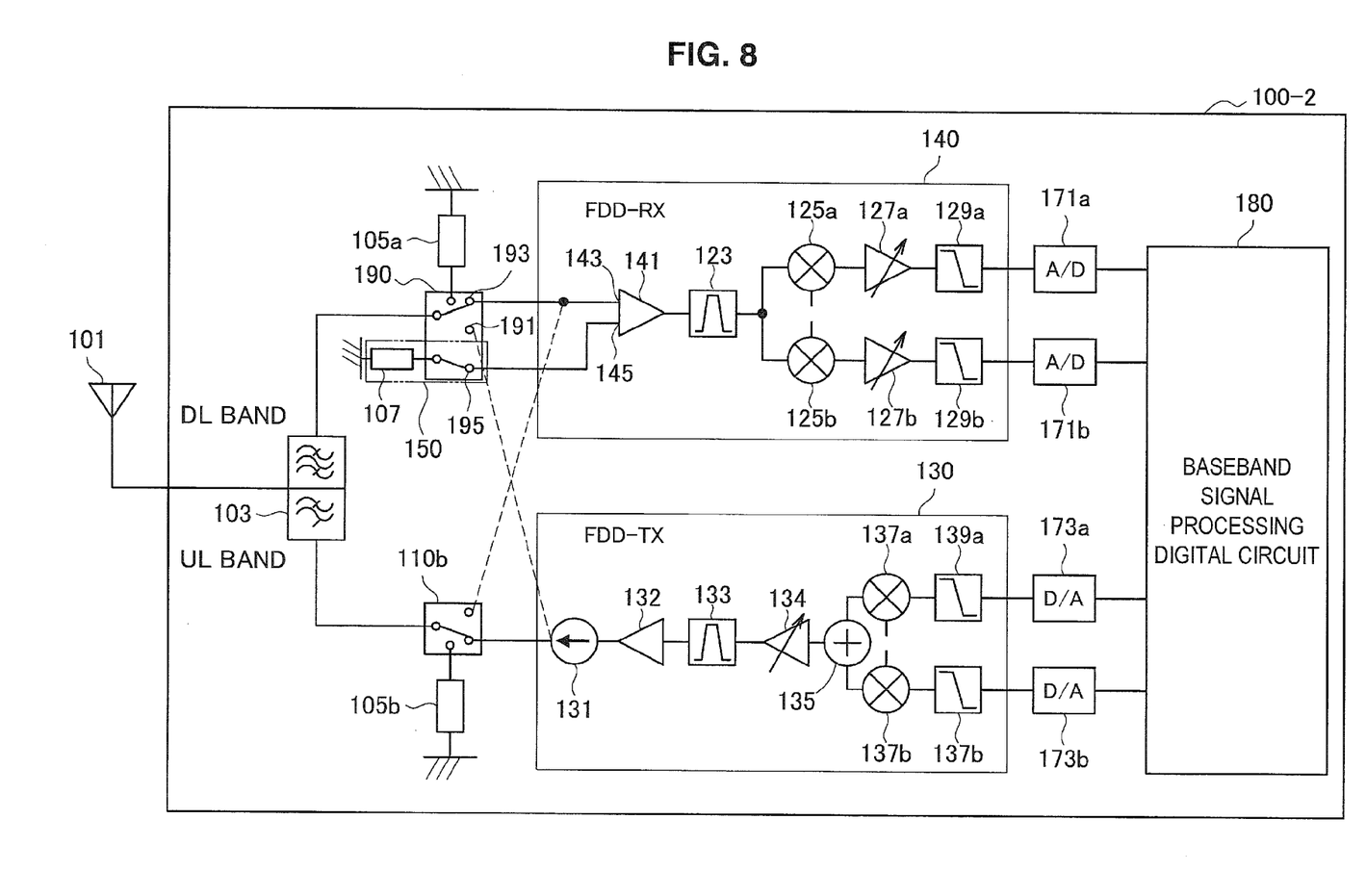
FIG. 8 is an explanatory diagram illustrating an operation of a high-frequency switch according to the second embodiment for performing radio communication in the FDD mode.

FIG. 8 is an explanatory diagram illustrating an operation of the high-frequency switch 190 according to the second embodiment for performing the radio communication in the FDD mode. With reference to FIG. 8, in the FDD mode, the high-frequency switch 190 connects the DL band terminal of the duplexer 103 to the first differential terminal 143 of the differential amplifier 141. Note that as in the first embodiment, the high-frequency switch 110b connects the UL band terminal of the duplexer 103 to the transmission system circuit 130. As the result, the first differential terminal 143 of the differential amplifier 141 is connected to the duplexer 103, while the second differential terminal 145 of the differential amplifier 141 is connected to the load circuit 107 (or the replica circuit 150).

In a second mode in the downlink frequency band, the high-frequency switch 190 connects one of the first terminal and the second terminal to the first differential terminal 143 of the differential amplifier 141 and the transmission system circuit 130 alternately. Further specifically, for example, the second mode is the TDD mode. In the TDD mode in the downlink frequency band, the high-frequency switch 190 connects the DL band terminal to the first differential terminal 143 of the differential amplifier 141 and the transmission system circuit 130 alternately. Hereinbelow, this point will be described more specifically with reference to FIG. 9.

Figure 9:
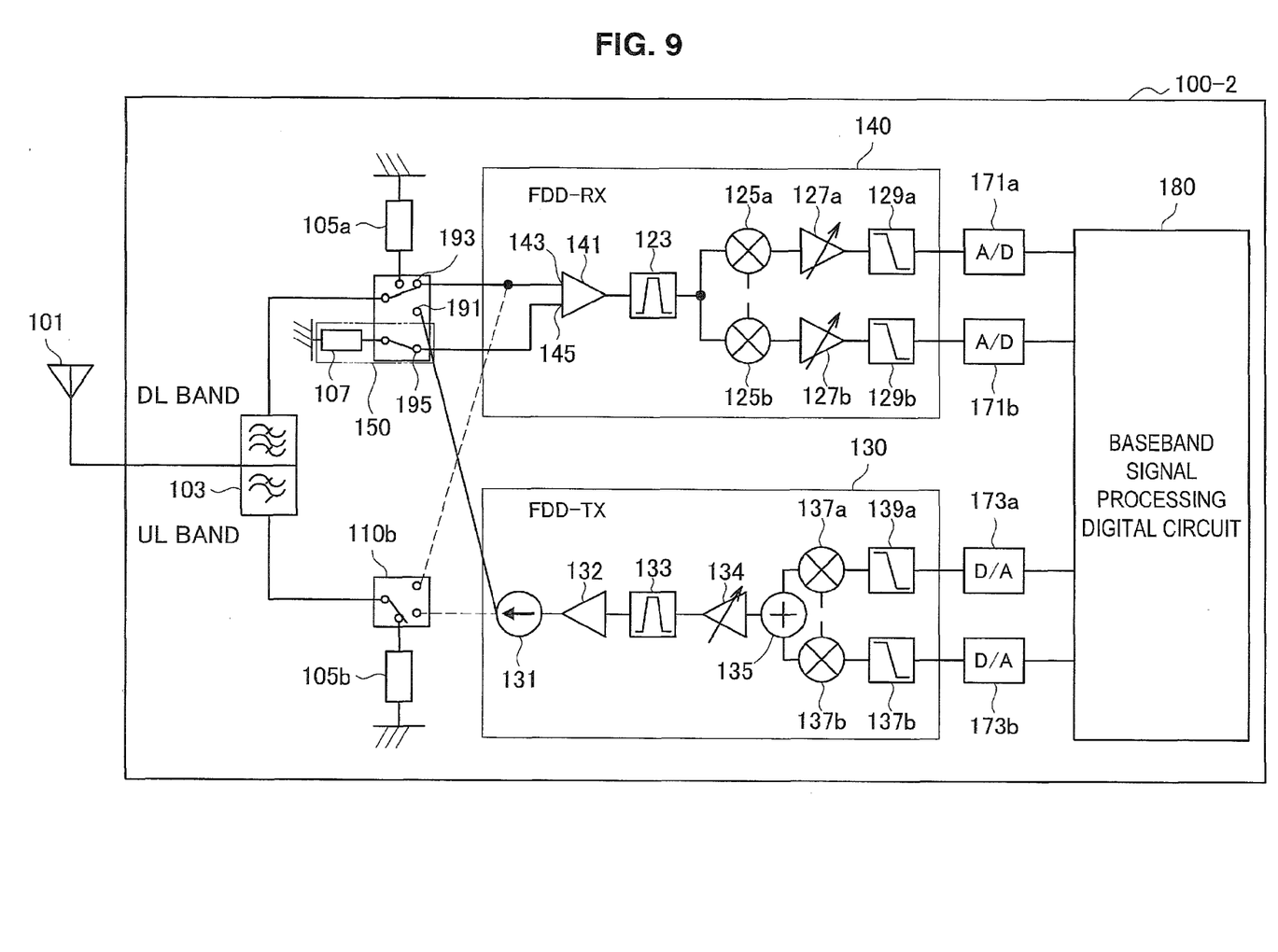
FIG. 9 is an explanatory diagram illustrating an operation of the high-frequency switch according to the second embodiment for performing the radio communication in the downlink frequency band in the TDD mode.

FIG. 9 is an explanatory diagram illustrating an operation of the high-frequency switch 190 according to the second embodiment for performing the radio communication in the downlink frequency band in the TDD mode. With reference to FIG. 9, in the TDD mode in the downlink frequency band, the high-frequency switch 190 connects the DL band terminal of the duplexer 103 to the first differential terminal 143 of the differential amplifier 141 and the transmission system circuit 130 alternately. In other words, the high-frequency switch 190 connects the DL band terminal to the first differential terminal 143 of the differential amplifier 141 in a period in which a radio signal is received in the downlink frequency band, and connects the DL band terminal to the transmission system circuit 130 in a period in which a radio signal is transmitted in the downlink frequency band.

In contrast, in the second mode (that is, the TDD mode) in the uplink frequency band, the high-frequency switch 190 connects one of the first terminal and the second terminal (that is, the DL band terminal) to the load circuit 105a.

In addition, for example, the high-frequency switch 190 connects the second differential terminal 145 of the differential amplifier 141 to the load circuit 107. Note that the part, of the high-frequency switch 190, for connecting the second differential terminal 145 of the differential amplifier 141 to the load circuit 107 is included in the replica circuit 150.

Meanwhile, the terminal device 100-2 might have a leakage signal (that is, a leaked transmission signal) which is leaked from the transmission system circuit 130 to the reception system circuit 140 through the high-frequency switch 190. For example, the leakage signal is leaked from a position 191 to a position 193 in the high-frequency switch 190, the position 191 allowing connection to the transmission system circuit 130, the position 193 allowing connection to the reception system circuit 140. It can be said that the position 193 is also a position allowing connection to the first differential terminal 143 of the differential amplifier 141. The FDD mode has leakage signal trouble, because transmission and reception are performed simultaneously. In contrast, the TDD mode does not have the leakage signal trouble, because the transmission and the reception are performed separately.

Note that the high-frequency switch 190 includes a position 195 which is almost as far from the position 191 as the position 193. At the position 195, the high-frequency switch 190 receives a signal leaked from the position 191. The position 195 of the high-frequency switch 190 is included in the aforementioned part for connecting the second differential terminal 145 of the differential amplifier 141 to the load circuit 107. That is, the position 195 is included in the replica circuit 150.

(Replica Circuit 150)

The replica circuit 150 reproduces the leakage signal leaked from the transmission system circuit 130 to the reception system circuit 140 through the high-frequency switch 190. For example, the replica circuit 150 generates a signal having a difference from the leakage signal limited to be within a predetermined range. In addition, the replica circuit 150 is connected to the second differential terminal 145 of the differential amplifier 141. The replica circuit 150 outputs the reproduction signal obtained by reproducing the leakage signal to the second differential terminal 145 of the differential amplifier 141.

Specifically, as described above, the leakage signal from the transmission system circuit 130 to the reception system circuit 140 through the high-frequency switch 190 is leaked, for example, in the high-frequency switch 190 from the position 191 to the position 193, the position 191 allowing the connection to the transmission system circuit 130, the position 193 allowing the connection to the reception system circuit 140. For example, at the position 195 which is almost as far from the position 191 as the position 193, the replica circuit 150 receives the signal leaked from the position 191, and thereby reproduces the leakage signal. The received signal becomes the reproduction signal described above. As described above, since the distance between the position 191 and the position 193 is almost the same as the distance between the position 191 and the position 195, a signal leakage from the position 191 to the position 195 occurs in the same manner as in a signal leakage from the position 191 to the position 193. As an example, the replica circuit 150 reproduces the leakage signal in the aforementioned manner.

As described above, the reproduction signal equivalent to the leakage signal is inputted to the second differential terminal 145 of the differential amplifier 141. Meanwhile, in the FDD mode, a reception signal from the duplexer 103 and the leakage signal from the position 191 to the position 193 are inputted to the first differential terminal 143 of the differential amplifier 141. As the result, in the differential amplifier 141, the reproduction signal equivalent to the leakage signal is subtracted from the reception signal and the leakage signal. That is, the leakage signal inputted to the first differential terminal 143 is cancelled out due to the reproduction signal inputted to the second differential terminal 145. As the result, a signal equivalent to the reception signal is outputted from the first differential terminal 143. Thus, it is possible to prevent the deterioration of the reception sensitivity in the terminal device 100-2. Note that in the TDD mode, a transmission signal is not generated when the reception signal is processed, and thus the reception sensitivity is not deteriorated due to the leakage signal.

Further, the replica circuit 150 includes the load circuit 107 involving the second impedance. The load circuit 107 is connected to the second differential terminal 145 of the differential amplifier 141 through the position 195. In addition, as described above, the second impedance corresponds to the output impedance of the duplexer 103.

With such a configuration of the load circuit 107, the position 193 and the position 195 have conditions closer to each other. Specifically, at the position 193, the duplexer 103 is located opposite from the first differential terminal 143. At the position 195, the load circuit 107 is located opposite from the second differential terminal 145. For this reason, the reproduction signal leaked from the position 191 to the position 195 becomes closer to the leakage signal from the position 191 to the position 193. As the result, the leakage signal is cancelled out more strictly in the differential amplifier 141. Thus, it is possible to more favorably prevent the deterioration of the reception sensitivity.

<3.2. Processing Flow>

Communication control processing according to the second embodiment is the same as the communication control processing according to the first embodiment. The aforementioned configuration of the terminal device 100-2 results in cancellation of the leakage signal and prevention of the deterioration of the reception sensitivity. Thus, for the communication control processing according to the second embodiment, the aforementioned communication control processing according to the first embodiment is referred to.

<<4. Conclusion>>

The terminal device and the communication control processing according to the embodiments of the present disclosure have been heretofore described by using FIGS. 1 to 9. According to the present embodiments, in the FDD mode, the high-frequency switch 110 connects the DL band terminal of the duplexer 103 to the reception system circuit 120 (or the reception system circuit 140) and connects the UL band terminal of the duplexer 103 to the transmission system circuit 130. In the TDD mode, the high-frequency switch 110 connects one of the DL band terminal and the UL band terminal of the duplexer 103 to the reception system circuit 120 (or the reception system circuit 140) and the transmission system circuit 130 alternately.

In this way, the circuits for FDD and the circuits for TDD are shared, and each of the FDD mode and the TDD mode is implemented due to the switchover by the high-frequency switch 110. Thus, it is possible to reduce the size of circuits for performing the radio communication supporting both FDD and TDD and thus to reduce the costs of the circuits. In addition, the circuit size reduction leads to power consumption reduction.

Moreover, for example, in the TDD mode, the high-frequency switch 110 connects the other one of the DL band terminal and the UL band terminal of the duplexer 103 to the load circuit 105.

As described above, in the TDD mode, the load circuit 105 is used as the end terminal for the high-frequency switch 110 which does not connect the reception system circuit 120 and the transmission system circuit 130 with the duplexer 103. Thereby, it is possible to reduce an insertion loss in the duplexer 103. In other words, without such an end terminal, the duplexer 103 might have such trouble that the passband becomes narrow or the frequency band which should be cut off is not cut off. However, with the end terminal which is the load circuit 105, such trouble can be prevented.

In addition, for example, the reception system circuit 140 includes the differential amplifier 141 having the first differential terminal 143 and the second differential terminal 145. In the FDD mode, the high-frequency switch 190 connects one of the DL band terminal and the UL band terminal of the duplexer 103 to the first differential terminal 143 of the differential amplifier 141. The terminal device 100-2 includes the replica circuit 150 which reproduces the leakage signal leaked from the transmission system circuit 130 to the reception system circuit 140 through the high-frequency switch 110. The second differential terminal 145 of the differential amplifier 141 is connected to the replica circuit 150. The replica circuit 150 outputs the reproduction signal obtained by reproducing the leakage signal to the second differential terminal 145 of the differential amplifier 141.

As described above, the reproduction signal equivalent to the leakage signal is inputted to the second differential terminal 145 of the differential amplifier 141. In the FDD mode, the reception signal and the leakage signal from the duplexer 103 are inputted to the first differential terminal 143 of the differential amplifier 141. As the result, in the differential amplifier 141, the reproduction signal equivalent to the leakage signal is subtracted from the reception signal and the leakage signal. That is, the leakage signal inputted to the first differential terminal 143 is cancelled out due to the reproduction signal inputted to the second differential terminal 145. As the result, a signal equivalent to the reception signal is outputted from the first differential terminal 143. Thus, it is possible to prevent the deterioration of the reception sensitivity in the terminal device 100-2.

The preferred embodiments of the present disclosure have been heretofore described with reference to the appended drawings. It goes without saying that the embodiments of the present disclosure are not limited to the examples. It should be understood by those skilled in the art that various modifications, combinations, sub-combinations and alterations may occur depending on design requirements and other factors insofar as they are within the scope of the appended claims or the equivalents thereof.

Although the descriptions have been given of the examples in which, for example, the first terminal and the second terminal of the duplexer are respectively provided with the load circuits involving the first impedance, the technology of the present disclosure is not limited to the examples. For example, the first terminal and the second terminal of the duplexer may be provided with a single load circuit shared by the first terminal and the second terminal.

In addition, although the terminal device has been described as an example of a communication control apparatus including the duplexer, the reception circuit, the transmission circuit, and the high-frequency switch, the technology of the present disclosure is not limited to the example. For example, the communication control apparatus may be any circuit included in a terminal device or may be an externally connected apparatus which provides the terminal device with a radio communication function. The radio communication apparatus is any apparatus having the radio communication function.

Moreover, the processing steps of the communication control processing in the present specification do not necessarily have to be executed in time series in the order described in the flowchart. For example, the processing steps in the communication control processing may be executed in the order different from the order described in the flowchart, or may be executed in parallel.

Further, it is possible to create a computer program for causing hardware such as a CPU, a ROM, and a RAM which are incorporated into a radio communication apparatus to exert functions equivalent to those in the configuration of the radio communication apparatus. Further, a recording medium storing the computer program is also provided.

Additionally, the present technology may also be configured as below.

(1) A radio communication apparatus including:
a duplexer including a first terminal for inputting and outputting a signal in a first frequency band, a second terminal for inputting and outputting a signal in a second frequency band, and a third terminal connected to an antenna;
a reception system circuit which processes a reception signal;
a transmission system circuit which generates a transmission signal; and
a switch which, in a first mode, connects one of the first terminal and the second terminal to the reception system circuit and connects the other one of the first terminal and the second terminal to the transmission system circuit and which, in a second mode, connects the one of the first terminal and the second terminal to the reception system circuit and the transmission system circuit alternately.

(2) The radio communication apparatus according to (1),
further including a load circuit involving first impedance,
wherein the switch connects the other one of the first terminal and the second terminal to the load circuit in the second mode.

(3) The radio communication apparatus according to (2),
wherein the first impedance is impedance corresponding to input impedance of a low-noise amplifier of the reception system circuit or output impedance of an isolator of the transmission system circuit.

(4) The radio communication apparatus according to any one of (1) to (3),
wherein the reception system circuit includes a differential amplifier having a first differential terminal and a second differential terminal,
wherein in the first mode, the switch connects one of the first terminal and the second terminal to the first differential terminal of the differential amplifier, and connects the other one of the first terminal and the second terminal to the transmission system circuit,
wherein the radio communication apparatus includes a replica circuit which reproduces a leakage signal leaked from the transmission system circuit to the reception system circuit through the switch,
wherein the second differential terminal of the differential amplifier is connected to the replica circuit, and
wherein the replica circuit outputs a reproduction signal obtained by reproducing the leakage signal, to the second differential terminal of the differential amplifier.

(5) The radio communication apparatus according to (4),
wherein in the switch, the leakage signal is leaked from a first position allowing connection to the transmission system circuit to a second position allowing connection to the reception system circuit, and
wherein at a third position, a distance between the third position and the first position being substantially the same as a distance between the second position and the first position, the replica circuit receives a signal leaked from the first position, and reproduces the leakage signal.

(6) The radio communication apparatus according to (5),
wherein the replica circuit includes a load circuit involving second impedance, and
wherein the load circuit involving the second impedance is connected to the second differential terminal of the differential amplifier via the third position.

(7) The radio communication apparatus according to (6),
wherein the second impedance is impedance corresponding to output impedance of the duplexer.

(8) The radio communication apparatus according to any one of (1) to (7),
wherein the first mode is an FDD mode, and
wherein the second mode is a TDD mode.

(9) The radio communication apparatus according to (8)
wherein one of the first frequency band and the second frequency band is a frequency band for a downlink in FDD, and the other one of the first frequency band and the second frequency band is a frequency band for an uplink in FDD.

(10) A communication control method performed by a radio communication apparatus including a duplexer which has a first terminal for inputting and outputting a signal in a first frequency band, a second terminal for inputting and outputting a signal in a second frequency band, and a third terminal connected to an antenna, a reception system circuit which processes a reception signal, and a transmission system circuit which generates a transmission signal, the method comprising:
in a first mode, connecting one of the first terminal and the second terminal to the reception system circuit and connecting the other one of the first terminal and the second terminal to the transmission system circuit; and
in a second mode, connecting the one of the first terminal and the second terminal to the reception system circuit and the transmission system circuit alternately.

(11) A program for causing a computer to execute by a radio communication apparatus including a duplexer which has a first terminal for inputting and outputting a signal in a first frequency band, a second terminal for inputting and outputting a signal in a second frequency band, and a third terminal connected to an antenna, a reception system circuit which processes a reception signal, and a transmission system circuit which generates a transmission signal:
controlling a switch such that, in a first mode, one of the first terminal and the second terminal is connected to the reception system circuit and the other one of the first terminal and the second terminal is connected to the transmission system circuit; and
controlling the switch such that, in a second mode, the one of the first terminal and the second terminal is connected to the reception system circuit and the transmission system circuit alternately.

The present disclosure contains subject matter related to that disclosed in Japanese Priority Patent Application JP 2012-155475 filed in the Japan Patent Office on Jul. 11, 2012, the entire content of which is hereby incorporated by reference.

What is claimed is:

1. A radio communication apparatus comprising:
a duplexer including a first terminal configured to input and output a signal in a first frequency band, a second terminal configured to input and output a signal in a second frequency band, and a third terminal connected to an antenna;
a reception system circuit, including a differential amplifier, configured to process a reception signal,
wherein the differential amplifier includes a first differential terminal and a second differential terminal;

a transmission system circuit configured to generate a transmission signal;

a switch, in a first mode, configured to connect the first terminal to the reception system circuit and connect the second terminal to the transmission system circuit and, in a second mode, connect the first terminal to the reception system circuit and the transmission system circuit alternately, wherein, in the first mode, the switch is configured to connect one of the first terminal and the second terminal to the first differential terminal of the differential amplifier, and connect the other one of the first terminal and the second terminal to the transmission system circuit; and a replica circuit connected to the second differential terminal of the differential amplifier and configured to output a reproduction signal to the second differential terminal of the differential amplifier, wherein the reproduction signal is obtained by reproducing a leakage signal leaked from the transmission system circuit to the reception system circuit through the switch.

2. The radio communication apparatus according to claim 1, further comprising a load circuit having first impedance, wherein the switch is configured to connect the second terminal to the load circuit in the second mode.

3. The radio communication apparatus according to claim 2, wherein the first impedance is impedance corresponding to input impedance of a low-noise amplifier of the reception system circuit or output impedance of an isolator of the transmission system circuit.

4. The radio communication apparatus according to claim 1, wherein in the switch, the leakage signal is leaked from a first position allowing connection to the transmission system circuit to a second position allowing connection to the reception system circuit, and wherein at a third position, the replica circuit is configured to receive a signal leaked from the first position, and reproduce the leakage signal.

5. The radio communication apparatus according to claim 4, wherein the replica circuit includes a load circuit having second impedance, and wherein the load circuit having the second impedance is connected to the second differential terminal of the differential amplifier via the third position.

6. The radio communication apparatus according to claim 5, wherein the second impedance is impedance corresponding to output impedance of the duplexer.

7. The radio communication apparatus according to claim 1, wherein the first mode is an FDD mode, and wherein the second mode is a TDD mode.

8. The radio communication apparatus according to claim 7, wherein one of the first frequency band and the second frequency band is a frequency band for a downlink in FDD, and the other one of the first frequency band and the second frequency band is a frequency band for an uplink in FDD.

9. A communication control method performed by a radio communication apparatus including a duplexer which has a first terminal configured to input and output a signal in a first frequency band, a second terminal configured to input and output a signal in a second frequency band, and a third terminal connected to an antenna, a reception system circuit including a differential amplifier which has a first differential terminal and a second differential terminal, the reception system circuit configured to process a reception signal, a transmission system circuit configured to generate a transmission signal, a switch, and a replica circuit connected to the second differential terminal of the differential amplifier, the method comprising:

in a first mode, connecting, via the switch, the first terminal to the reception system circuit, connecting the second terminal to the transmission system circuit, connecting one of the first terminal and the second terminal to the first differential terminal of the differential amplifier, and connecting the other one of the first terminal and the second terminal to the transmission system circuit;

in a second mode, connecting, via the switch, the first terminal to the reception system circuit and the transmission system circuit alternately; and outputting, by the replica circuit, a reproduction signal to the second differential terminal of the differential amplifier, wherein the reproduction signal is obtained by reproducing a leakage signal leaked from the transmission system circuit to the reception system circuit through the switch.

10. A non-transitory computer-readable medium having stored thereon instructions, which when executed by a processor, cause the processor to control a radio communication apparatus including a duplexer which has a first terminal for inputting and outputting a signal in a first frequency band, a second terminal for inputting and outputting a signal in a second frequency band, and a third terminal connected to an antenna, a reception system circuit including a differential amplifier which has a first differential terminal and a second differential terminal, the reception system circuit configured to process a reception signal, a transmission system circuit configured to generate a transmission signal, and a replica circuit connected to the second differential terminal of the differential amplifier, by:

controlling a switch such that, in a first mode, the first terminal is connected to the reception system circuit, the second terminal is connected to the transmission system circuit, one of the first terminal and the second terminal is connected to the first differential terminal of the differential amplifier, and the other one of the first terminal and the second terminal is connected to the transmission system circuit;

controlling the switch such that, in a second mode, the first terminal is connected to the reception system circuit and the transmission system circuit alternately; and outputting, by the replica circuit, a reproduction signal to the second differential terminal of the differential amplifier, wherein the reproduction signal is obtained by reproducing a leakage signal leaked from the transmission system circuit to the reception system circuit through the switch.

* * * * *